United States Patent [19]

Fujino

[11] Patent Number: 4,976,764
[45] Date of Patent: Dec. 11, 1990

[54] METHOD OF PRETREATING GLASS PREFORM WITH OXYGEN PLASMA

[75] Inventor: Takuo Fujino, Akishima, Japan
[73] Assignee: Hoya Corporation, Tokyo, Japan
[21] Appl. No.: 407,323
[22] Filed: Sep. 14, 1989

[30] Foreign Application Priority Data

Sep. 28, 1988 [JP] Japan ................ 63-243229

[51] Int. Cl.$^5$ ............................................. C03C 15/00
[52] U.S. Cl. ...................................... 65/30.1; 65/32.1; 65/102; 204/164
[58] Field of Search .................. 65/30.1, 32.5, 32.1, 65/18.4, 102, 111; 204/164, 176; 219/121.36, 121.59

[56] References Cited

U.S. PATENT DOCUMENTS

| | | | |
|---|---|---|---|
| 2,795,084 | 6/1957 | Littleton | 65/23 |
| 3,208,839 | 9/1965 | Nordberg | 65/32.5 |
| 3,438,803 | 4/1969 | Dubble et al. | 65/30.1 |
| 3,481,779 | 12/1969 | Dorst | 65/30.1 |
| 3,511,626 | 5/1970 | Wynn | 65/30.1 |
| 3,920,483 | 11/1975 | Johnson, Jr. et al. | 65/111 |
| 3,948,601 | 4/1976 | Fraser et al. | 65/32.1 |
| 4,624,859 | 11/1986 | Akira et al. | 204/164 |
| 4,629,489 | 12/1986 | Hirota et al. | 65/102 |
| 4,761,170 | 8/1988 | Mansfield | 65/18.4 |

FOREIGN PATENT DOCUMENTS

| | | | |
|---|---|---|---|
| 1100240 | 10/1958 | Fed. Rep. of Germany | 65/111 |
| 55-130840 | 10/1980 | Japan | 65/30.1 |
| 61-21925 | 1/1986 | Japan | 65/102 |
| 62-162629 | 7/1987 | Japan. | |

OTHER PUBLICATIONS

Blumetritt et al. IBM Technical Disclosure Bulletin, Plasma Flame Sprayed Coatings with Metallic Interface, vol. 12, No. 9, Feb. 1970, p. 1364.

Primary Examiner—David L. Lacey
Assistant Examiner—John J. Bruckner
Attorney, Agent, or Firm—Nixon & Vanderhye

[57] ABSTRACT

According to the present process for producing a molded glass article, the surface of a lead oxide-containing glass material to be press molded is subjected in advance to an oxidation treatment with activated oxygen ion; thereby, there takes place no reduction reaction of lead oxide at the glass surface, at the time of press molding of the glass material, and there can be obtained a molded glass article with a clear surface. Further, there occurs no adhesion of lead to the surface of the mold used, and consequently the mold life is extended, which is very economical.

3 Claims, 1 Drawing Sheet

METHOD OF PRETREATING GLASS PREFORM WITH OXYGEN PLASMA

BACKGROUND OF THE INVENTION (1) Field of the Invention

The present invention relates to a process for producing a molded glass article and more particularly to a process for producing a molded glass article from a glass material containing lead oxide.

(2) Description of the Prior Art

In recent years, many attempts have been made to press mold an optical lens or the like at a high precision without conducting post-treatments such as polishing and the like. In one of such molding processes, a glass material placed between an upper mold and a lower mold both made of a ceramic or the like is heated to a temperature close to the softening point of said glass and then subjected to press molding. This press molding is effected generally in a non-oxidizing or reducing gas atmosphere such as nitrogen gas or the like. The reason is that the use of a non-oxidizing gas atmosphere can prevent not only the oxidation of the material (e.g. stainless steel) constituting the pressing machine used but also the oxidation of the mold surface (having a mirror surface) which is in contact with the glass material (the mold surface, when the mold is repeatedly used in an oxidizing atmosphere, gets rough and loses the mirror surface smoothness).

However, when a glass material containing, for example, about 20% by weight or more of lead oxide is subjected to press molding in a non-oxidizing atmosphere containing oxygen in a very small amount of 100 ppm or below, the lead oxide (PbO) at the glass surface is chemically reduced to become other lead compound or metallic lead (Pb), and the surface of the molded glass article gets cloudy. When the mold is used repeatedly under such a condition, the mold surface reacts with the lead component of the glass surface to form a reaction product and thereby to lose the mirror surface smoothness. Presently, there has been found no effective method for dissolving the reaction product in order to restore the original mirror surface. Moreover, the molded glass article obtained with the mold whose surface has lost the mirror surface smoothness, has an uneven surface.

In order to solve the above problem encountered when a lead oxide-containing glass is subjected to press molding, Japanese Patent Application Kokai (Laid-Open) No. 162629/1987 discloses a process wherein press molding is effected by changing the oxygen concentration in non-oxidizing atmosphere after every given times of molding.

However, when a lead oxide-containing glass material is subjected to press molding by the process described in the above patent document, neither the cloudiness at the molded glass article surface nor the adhesion of lead to the mold surface can be prevented completely.

SUMMARY OF THE INVENTION

The object of the present invention is to provide a process for producing a molded glass article by press molding a glass material containing lead oxide, which process has such advantages that the molded glass article has no surface cloudiness and there occurs no lead adhesion to the surface of the mold used.

The above object of the present invention has been achieved by, when a molded glass article is produced by press molding a glass material containing lead oxide, subjecting, prior to the press molding, the surface of the glass material to an oxidation treatment with activated oxygen ion.

According to the present invention, there is provided a process for producing a molded glass article by press molding a glass material containing lead oxide, which process comprises subjecting, prior to the press molding, the surface of the glass material to an oxidation treatment with activated oxygen ion.

DETAILED DESCRIPTION OF THE INVENTION

As a typical example of the oxidation treament with activated oxygen ion, there can be mentioned oxygen plasma ashing. In the present invention, the oxidation treatment can be effected by any method as long as the surface of a glass material to be press molded can be subjected to an oxidation treatment with activated oxygen ion. It is also possible to give rise to oxygen plasma ashing by the use of, for example, an ion-bombarding or ion-showering apparatus. A glass material containing lead oxide, when its surface is subjected to an oxidation treatment with activated oxygen ion prior to press molding, not only causes no reduction reaction of lead oxide at the glass surface even when press molding is effected in a reducing atmosphere at temperatures of the glass softening point or above, but also gives a molded glass article free from surface cloudiness. Further in this case, there occurrs no adhesion of lead to the surface of the mold used.

The present process for producing a molded glass article is hereinafter described in detail by way of Examples.

Figure 1:
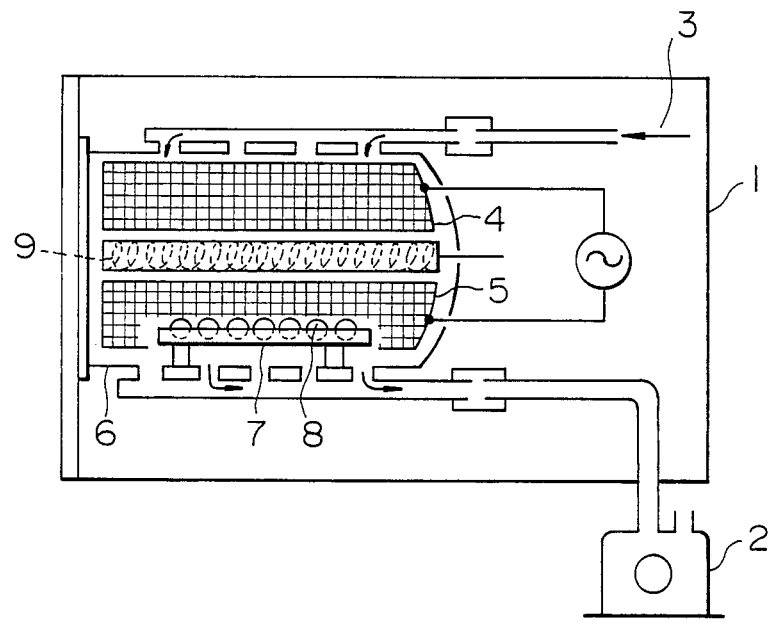
FIG. 1 is a schematic drawing of an apparatus used for effecting oxygen plasma ashing in the process of the present invention.

FIG. 1 is a schematic drawing of an apparatus (DES112-304AV manufactured by Plasma System Co.) for effecting oxygen plasma ashing. In FIG. 1, the numeral 1 is an oxidation treatment chamber; the numeral 2 is a rotary pump for reducing the inside pressure of the chamber 1 to a desired vacuum; the numeral 3 is an oxygen inlet for introducing oxygen into the chamber 1 after the inside pressure of the chamber 1 has been reduced to a desired vacuum by the rotary pump. The numerals 4 and 5 are high frequency electrodes, and a high frequency electric power is generated between these two electrodes. The numeral 6 is a quartz-made inner chamber, in which a glass sample 8 is mounted on a quartz-made holder 7. The numeral 9 is an infrared lamp for heating the glass sample 8 and said infrared lamp is arranged outside the quartz-made inner chamber 6.

As the glass sample 8 whose surface was to be subjected to an oxygen plasma ashing treatment with the apparatus shown in FIG. 1, there were used three kinds of glass materials which were different in lead oxide content and which had been thoroughly cleaned by ultrasonic cleaning, i.e. glass sample No. 1 (PbO=66% by weight, softening point=470° C.), No. 2 (PbO=40.5% by weight, softening point=465° C.) and No. 3 (PbO=23% by weight, softening point=480° C.).

Each of these glass materials as the glass sample 8 was mounted on the quartz-made holder 7; the inside pressure of the chamber 1 was reduced to 0.03 Torr by the rotary pump 2; then, oxygen was introduced into the chamber 1 through the oxygen inlet 3 and thereby the vacuum inside the chamber 1 was adjusted to 0.8 Torr.

A given high frequency electric power was generated between the high frequency electrodes 4 and 5 while the glass sample 8 was heated and kept at a given temperature by the infrared lamp 9, to effect an oxygen plasma ashing treatment.

This oxygen plasma ashing was effected under the following two treatment conditions (A) and (B) which were different in high frequency output and treatment temperature.

|  | Treatment conditions | |
|---|---|---|
|  | (A) | (B) |
| High frequency output (W) | 600 | 1200 |
| Treatment temperature (°C.) | 50 | 130 |
| Treatment time (min) | 2.5, 5 and 10 | 2.5, 5 and 10 |

The inside of the chamber 1 is kept always clean. Therefore, the glass sample 8 after oxygen plasma ashing could be used for press molding as it was, without being subjected to recleaning.

Next, mention is made on press molding of the glass sample subjected to the plasma ashing treatment.

Figure 2A:
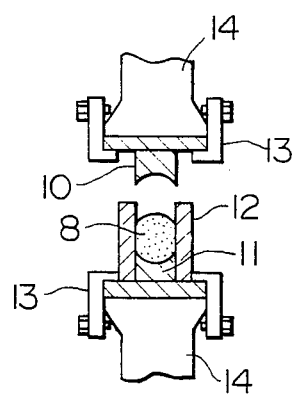
FIG. 2(a) is a drawing showing the "right before press molding" condition in a pressing machine used for effecting press molding in the process of the present invention.
Figure 2B:
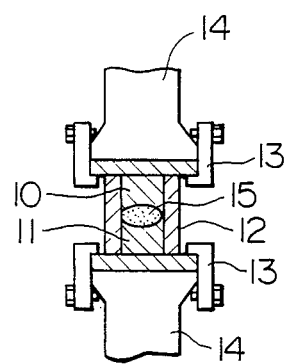
FIG. 2(b) is a drawing showing the "right after press molding" condition in the same pressing machine.

FIG. 2(a) is a drawing showing the "right before glass press molding" condition in a pressing machine. In FIG. 2(a), the numeral 10 is an upper mold; the numeral 11 is a lower mold; the numeral 12 is a sleeve; the numeral 13 is fixtures for holding the upper and lower molds; the numeral 14 is press heads; and a glass sample 8 to be press molded is placed in a space formed between the lower mold 11 and the sleeve 12. FIG. 2(b) is a drawing showing the "right after glass press molding" condition in the same pressing machine. In FIG. 2(b), an intended molded glass article 15 has been obtained by lowering the upper mold 10 to effect pressing.

Using the pressing machine shown in FIG. 2, the above mentioned three lead oxide-containing glasses subjected to oxygen plasma ashing were press molded at 570° C. in a nitrogen atmosphere to obtain molded glass articles. For comparison, the same three lead oxide-containing glasses not subjected to any oxygen plasma ashing were press molded under the same conditions to obtain molded glass articles.

The results of press molding of the three lead oxide-containing glasses subjected to oxygen plasma ashing are shown in Table 1, together with the results of press molding of the three lead oxide-containing glasses not subjected to oxygen plasma ashing. These results are summarized as follows.

(1) When there was effected no oxygen plasma ashing, all of the molded glass articles obtaiend from the glass sample Nos. 1, 2 and 3 had cloudiness. (In each test, 50 test pieces were used for each sample.) Cloudiness was particularly severe in the molded articles obtained from the glass sample Nos. 1 and 2.

(2) When there was effected oxygen plasma ashing, good results were obtained even though the high frequency output and treatment temperature were varied over a wide range. That is, at a high frequency output of 600 W and a treatment temperature of 50° C., all the molded articles obtained from the test pieces of the glass sample No. 1 had no cloudiness when the ashing time was 5 min or longer. In all the molded articles obtained from the glass sample Nos. 2 and 3, there was no cloudiness when the ashing time was 2.5 min or longer.

At a high frequency output of 1200 W and a treatment temperature of 130° C., all the molded articles obtained from the glass sample Nos. 1, 2 and 3 had no cloudiness when the ashing time was 2.5 min or longer.

It is appreciated from the above results that oxygen plasma ashing is a very effective means for prevention of surface cloudiness in molded glass articles obtained by press molding of lead oxide-containing glass materials.

The press molding of the glass sample Nos. 1, 2 and 3 subjected to oxidizing treatments under the oxygen plasma ashing conditions (A) and (B) was repeated using the same mold. In each case, there was no adhesion of lead to the mold surface even after 8,000–10,000 times repetition of press molding. In contrast, when no oxygen plasma ashing was effected, there was seen adhesion of lead to the mold surface after about 500–800 times repetition of press molding.

TABLE 1

| Glass sample | | | | Oxygen plasma ashing conditions | | | | | |
|---|---|---|---|---|---|---|---|---|---|
| | | | | (A) High frequency output: 600 W Treatment temperature: 50° C. | | | (B) High frequency output: 1200 W Treatment temperature: 130° C. | | |
| No. | PbO content in glass (wt. %) | Softening point (°C.) | Oxygen plasma ashing: Not effected | 2.5 min | 5 min | 10 min | 2.5 min | 5 min | 10 min |
| 1 | 66.0 | 470 | Inspection 1 Cloudiness in all pieces | Inspection 1 Very slight cloudiness in several pieces Inspection 2 Slight cloudiness in all pieces | Inspections 1, 2 No cloudiness in any pieces (In both inspections) | Same as left | Same as left | Same as left | Same as left |
| 2 | 40.5 | 465 | Inspection 1 Cloudiness in all pieces | Inspections 1, 2 No cloudiness in any pieces (In both inspections) | Same as left | Same as left | Same as left | Same as left | Same as left |
| 3 | 23.0 | 480 | Inspection 1 Slight cloudiness in all | Inspections 1, 2 No cloudiness in any pieces (In | Same as left | Same as left | Same as left | Same as left | Same as left |

TABLE 1-continued

| Glass sample | | | Oxygen plasma ashing conditions | | | | | |
| --- | --- | --- | --- | --- | --- | --- | --- | --- |
| | | | (A) High frequency output: 600 W Treatment temperature: 50° C. | | | (B) High frequency output: 1200 W Treatment temperature: 130° C. | | |
| No. | PbO content in glass (wt. %) | Softening point (°C.) | Oxygen plasma ashing: Not effected | 2.5 min | 5 min | 10 min | 2.5 min | 5 min | 10 min |
| | | | pieces | both inspections) | | | | | |

Number of test pieces: 50 for each test
Inspection method: In Inspection 1, each molded glass article was inspected visually.

Thus, according to the present process for producing a molded glass article, the surface of a lead oxide-containing glass material to be press molded is subjected in advance to an oxidation treatment with activated oxygen ion; thereby, there takes place no reduction reaction of lead oxide at the glass surface, at the time of press molding of the glass material and there can be obtained a molded glass article with a clear surface. Further, there occurs no adhesion of lead to the surface of the mold used, and consequently the mold life is extended, which is very economical.

What is claimed is:

1. A process for producing a molded glass article by press molding a glass material containing lead oxide, which process comprises the steps of:
   (a) subjecting the surface of the glass material to a plasma ashing treatment with activated oxygen, for a period of at least 2.5 minutes, and thereafter
   (b) press-molding the glass material at an elevated temperature in a nonoxidizing or reducing atmosphere.

2. The process according to claim 1, wherein the glass material contains at least 20% by weight lead oxide.

3. The process according to claim 2, wherein prior to step (a), the glass material is cleaned by ultrasonic cleaning.

* * * * *